(12) United States Patent
Fecteau

(10) Patent No.: US 11,685,334 B2
(45) Date of Patent: Jun. 27, 2023

(54) AIRBAG MODULE WITH INVERTED SEAM AND FOLDING TAB

(71) Applicant: Joyson Safety Systems Accquisition LLC, Auburn Hills, MI (US)

(72) Inventor: Ryan Fecteau, Lake Orion, MI (US)

(73) Assignee: Joyson Safety Systems Acquisition LLC, Auburn Hills, MI (US)

( * ) Notice: Subject to any disclaimer, the term of this patent is extended or adjusted under 35 U.S.C. 154(b) by 0 days.

(21) Appl. No.: 17/847,764

(22) Filed: Jun. 23, 2022

(65) Prior Publication Data

US 2023/0001878 A1    Jan. 5, 2023

Related U.S. Application Data

(60) Provisional application No. 63/216,822, filed on Jun. 30, 2021.

(51) Int. Cl.
| | | |
|---|---|---|
| *B60R 21/237* | (2006.01) | |
| *B60R 21/231* | (2011.01) | |
| *B60R 21/2338* | (2011.01) | |
| *B60R 21/20* | (2011.01) | |
| B60R 21/207 | (2006.01) | |
| B60R 21/235 | (2006.01) | |

(52) U.S. Cl.
CPC .......... *B60R 21/237* (2013.01); *B60R 21/20* (2013.01); *B60R 21/231* (2013.01); *B60R 21/2338* (2013.01); *B60R 21/207* (2013.01); *B60R 2021/23146* (2013.01); *B60R 2021/23561* (2013.01); *B60R 2021/23576* (2013.01); *B60R 2021/23595* (2013.01)

(58) Field of Classification Search
CPC ..... B60R 21/237; B60R 21/20; B60R 21/207; B60R 21/23138; B60R 21/231; B60R 2021/23571; B60R 2021/23576; B60R 2021/23146
USPC ..................... 280/728.1, 730.1, 730.2, 743.1
See application file for complete search history.

(56) References Cited

U.S. PATENT DOCUMENTS

| 2016/0229366 A1* | 8/2016 | Witt ........................ B60R 21/06 |
| 2021/0197749 A1* | 7/2021 | Wiik ..................... B60R 21/207 |

FOREIGN PATENT DOCUMENTS

| CN | 101264752 A | * | 9/2008 | .......... B60R 21/207 |
| DE | 19848905 A1 | * | 5/1999 | .......... B60R 21/207 |
| WO | WO-2005102789 A1 | * | 11/2005 | .......... B60R 21/207 |
| WO | WO-2012105956 A1 | * | 8/2012 | .......... B60R 21/207 |

* cited by examiner

*Primary Examiner* — Keith J Frisby
(74) *Attorney, Agent, or Firm* — Meunier Carlin & Curfman LLC

(57) ABSTRACT

An airbag module according to various implementations includes an inflatable cushion, a folding tab, and an inflator. The inflatable cushion includes a first panel and a second panel, each of the first and second panels including an inner surface and an outer surface. When the outer surfaces of the first and second panels are coupled together to form an inverted seam, the folding tab is coupled between the respective outer surfaces of the first and second panels. As a result, the inflatable cushion includes an increased strength while maintaining an ease of assembly using current inflatable cushion folding machines.

18 Claims, 10 Drawing Sheets

AIRBAG MODULE WITH INVERTED SEAM AND FOLDING TAB

CROSS-REFERENCE TO RELATED APPLICATIONS

This application claims the benefit of U.S. Provisional Patent Application No. 63/216,822, filed Jun. 30, 2021, the content of which is incorporated herein by reference in its entirety.

BACKGROUND

When preparing an airbag module for installation in a vehicle, including but not limited to a vehicle seat, an inflatable cushion of the airbag module is folded into a compact shape in order to properly fit within the seat. Typical inflatable cushions comprise a non-inverted seam because non-inverted seams provide for simple folding operations when using a folding machine. However, non-inverted seams are weaker than inverted seams and therefore the inflatable cushion must be reinforced for strength. Inverted seams provide improved strength and integrity but are not as easily folded using a folding machine. Therefore, there is a need for an airbag module comprising an inflatable cushion with an inverted seam that can be efficiently folded using current folding machines.

SUMMARY

Various implementations include an airbag module for protecting an occupant of a vehicle seat comprising an inflatable cushion, a folding tab, and an inflator. The inflatable cushion comprises a first panel and a second panel, the first panel comprising an inner surface and an outer surface and the second panel comprising an inner surface and an outer surface. The folding tab comprises an inner portion and an outer portion. The inflator provides an inflation gas for inflating the inflatable cushion.

An outer surface of the first panel and an outer surface of the second panel are coupled to each other along a seam such that the outer surface of the first panel and the outer surface of the second panel face each other along the seam. The seam is adjacent a first portion of a perimeter of the first panel and a first portion of a perimeter of the second panel. In some implementations, the inner surface of the first panel and the inner surface of the second panel are coupled to each other along a second seam such that the inner surface of the first panel and the inner surface of the second panel face each other along the second seam. The second seam is adjacent a second portion of the perimeter of the first panel and a second portion of the perimeter of the second panel. The inner surface of the first panel, the inner surface of the second panel, the first seam, and the second seam define an inflation chamber for the inflation gas.

The inner portion of the folding tab is disposed between the outer surface of the first panel and the outer surface of the second panel and the folding tab is coupled to the first panel and the second panel by the first seam. The outer portion of the folding tab extends beyond the first seam in a direction away from the perimeter of the first panel and the perimeter of the second panel.

DETAILED DESCRIPTION

The present disclosure relates to safety devices for passenger vehicles. The devices, systems, and methods disclosed herein provide for an airbag module comprising an inflatable cushion comprising an inverted seam and a folding tab to improve strength and integrity and to provide for more efficient folding operations. The airbag module may be installed into or onto a vehicle seat for protecting an occupant of the vehicle during a side impact accident. The inflatable cushion comprises a first panel having an inner surface and an outer surface and a second panel having an inner surface and an outer surface. The outer surface of the first panel and the outer surface of the second panel are coupled to each other by a first seam, and the folding tab is coupled between the outer surface of the first panel and the outer surface of the second panel by the first seam.

Figure 2:
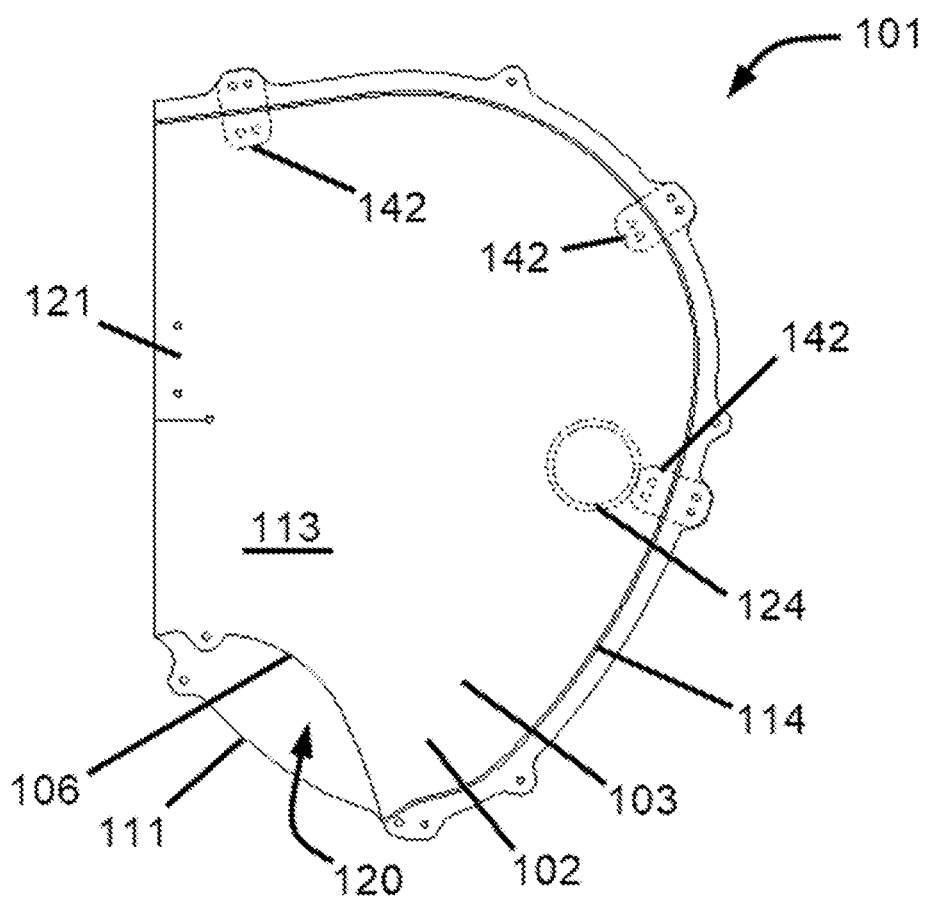
FIG. 2 is a side view of the inflatable cushion of FIG. 1 in a partially assembled condition.
Figure 3:
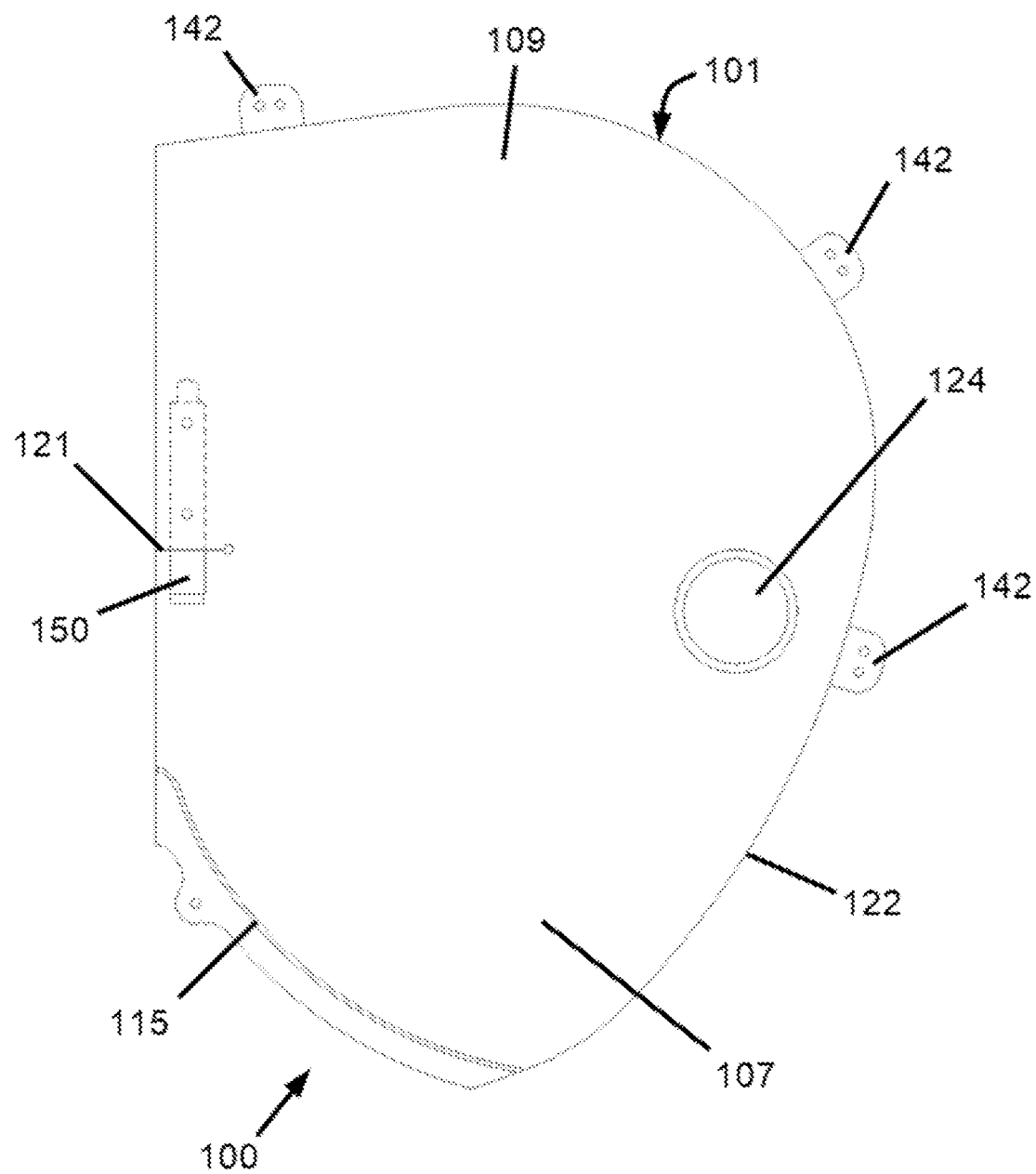
FIG. 3 is a side view of an airbag module comprising the inflatable cushion of FIG. 2 in a fully assembled condition.
Figure 4:
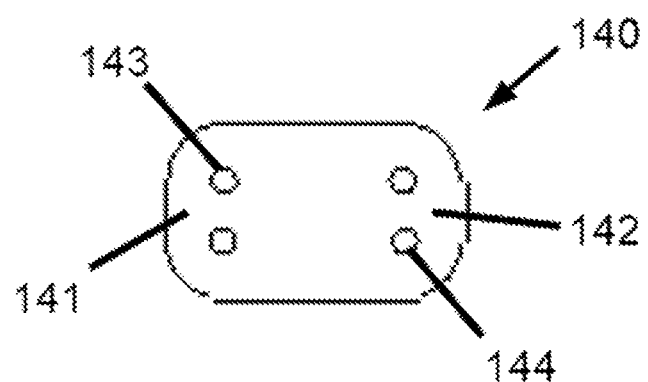
FIG. 4 is a top view of a folding tab for use with the inflatable cushion of FIG. 1.
Figure 5:
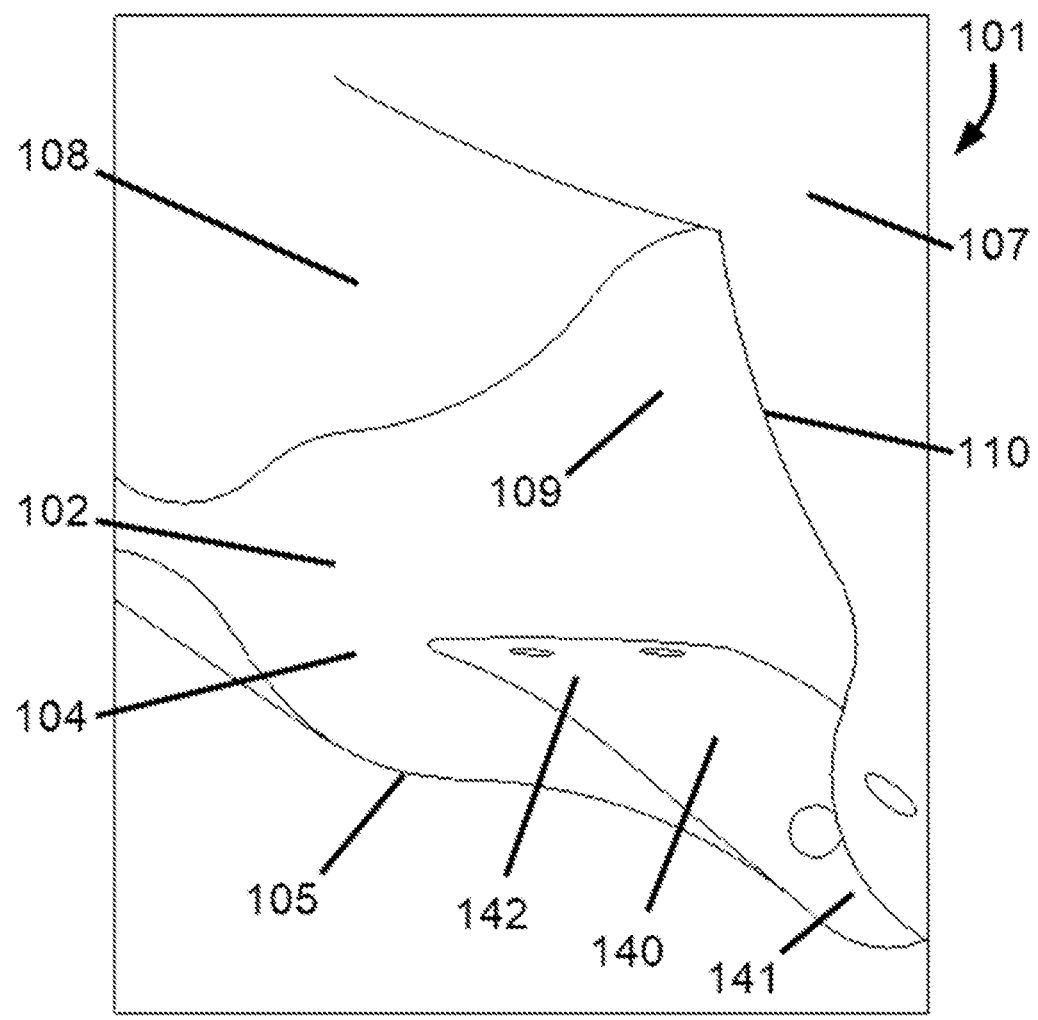
FIG. 5 is a view of the inflatable cushion of FIG. 1 during assembly.

As shown in FIGS. 1-7B, an airbag module 100 of a first implementation comprises an inflatable cushion 101, a folding tab 140, and an inflator 150. The inflatable cushion 101 comprises a first panel 102 and a second panel 107. The first panel 102 comprises an inner surface 103 and an outer surface 104 and the second panel 107 comprises an inner surface 108 and an outer surface 109. As seen in FIG. 4, the folding tab 140 comprises an inner portion 141 and an outer portion 142. The folding tab 140 is made from one piece of airbag fabric (e.g., woven nylon). In other implementations, the folding tab may be made from woven polyester.

Figure 1:
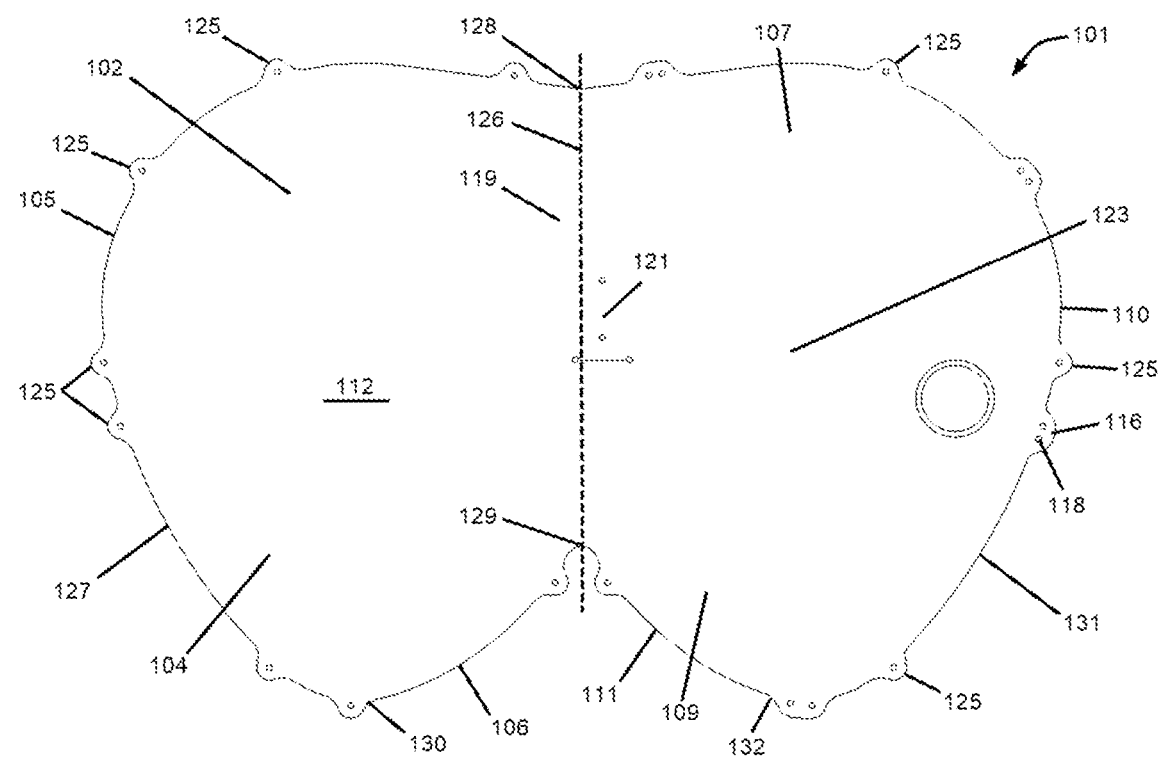
FIG. 1 is a top view of an unassembled inflatable cushion according to one implementation.

As shown in FIG. 1, the first panel 102 comprises a perimeter 127 extending along the first panel 102 between a first perimeter transition 128 and a second perimeter transition 129. A third perimeter transition 130 is positioned along the perimeter 127 between the first perimeter transition 128 and the second perimeter transition 129. A first perimeter portion 105 of the first panel 102 extends between the first perimeter transition 128 and the third perimeter transition 130. A second perimeter portion 106 of the first panel 102 extends between the third perimeter transition 130 and the second perimeter transition 129.

The second panel 107 comprises a perimeter 131 extending along the second panel 107 between the first perimeter transition 128 and the second perimeter transition 129. A fourth perimeter transition 132 is positioned along the perimeter 131 between the first perimeter transition 128 and the second perimeter transition 129. A first perimeter portion 110 of the second panel 107 extends between the first perimeter transition 128 and the fourth perimeter transition 132. A second perimeter portion 111 of the second panel 107 extends between the fourth perimeter transition 132 and the second perimeter transition 129.

To assemble the inflatable cushion 101, the outer surface 104 of the first panel 102 and the outer surface 109 of the second panel 107 are coupled to each other along a first seam 114 such that the outer surface 104 of the first panel 102 and the outer surface 109 of the second panel 107 face each other along the first seam 114, and the first seam 114 is adjacent the first perimeter portion 105 of the first panel 102 and the first perimeter portion 110 of the second panel 107. To accomplish this, the outer surface 104 of the first panel 102 is laid upon the outer surface 109 of the second panel 107 (or vice versa) before applying the first seam 114. For example, in the implementation shown in FIG. 1, one sheet of airbag fabric (e.g., woven nylon) comprises the first panel 102 and the second panel 107, and the first panel 102 and the second panel 107 are integrally coupled along a fold line 126 defined through a central region 119. In other words, the single sheet of airbag fabric includes a portion that is the first panel 102 and a portion that is the second panel 107. The outer surface 104 of the first panel 102 is folded onto the outer surface 109 of the second panel 107 (or vice versa) along the fold line 126, and the first perimeter portion 105 of the first panel 102 is aligned with the first perimeter portion 110 of the second panel 107.

Once the outer surface 104 of the first panel 102 is adjacent the outer surface 109 of the second panel 107 and the first perimeter portion 105 of the first panel 102 and the first perimeter portion 110 of the second panels 107 are aligned, the first seam 114 is applied to couple the first perimeter portion 105 of the first panel 102 to the first perimeter portion 110 of the second panel 107. The first seam 114 may comprise stitching, for example nylon thread. In other implementations, the first seam may comprise polyester thread. At this point, the inflatable cushion 101 is in a partially assembled, inside-out condition, as seen in FIG. 2.

Because the second perimeter portion 106 of the first panel 102 and the second perimeter portion 111 of the second panel 107 are not coupled together by the first seam 114, an opening 120 remains through which the outer surface 104 of the first panel 102 and the outer surface 109 of the second panel 107 can be pulled out in order to reverse the inflatable cushion from the inside-out condition to an outside-out condition. Once in the outside-out condition, the inner surface 103 of the first panel 102 and the inner surface 108 of the second panel 107 are adjacent each other and are coupled together along a second seam 115, which is adjacent the second perimeter portion 106 of the first panel 102 and the second perimeter portion 111 of the second panel 107, such that the inner surface 103 of the first panel 102 and the inner surface 108 of the second panel 107 face each other along the second seam 115, as seen in FIGS. 2-3. The second seam 115 may comprise stitching, for example nylon thread. In other implementations, the second seam may comprise polyester thread. At this point, the inflatable cushion 101 is in a fully assembled condition, as seen in FIG. 3.

In the fully assembled condition, an inflation chamber 117 is defined by and between the inner surface 103 of the first panel 102, the inner surface 108 of the second panel 107, the first seam 114, the second seam 115, and the fold line 126. Inflator 150 is coupled to an inflator mounting portion 121 of the inflatable cushion 101. Inflator mounting portion 121 may be adjacent the central region 119 of the inflatable cushion 101.

Inflator 150 provides inflation gas into the inflation chamber 117 for inflating the inflatable cushion 101 during an accident. The inflator 150 is triggered by an electrical signal from an electronic control unit (ECU) within the vehicle when one or more crash sensors detect an accident. The inflator 150 may be a pyrotechnic gas generator. In other implementations, the inflator may be a pressurized stored gas inflator or a hybrid inflator comprising both pyrotechnics and pressurized stored gas.

Figure 6A:
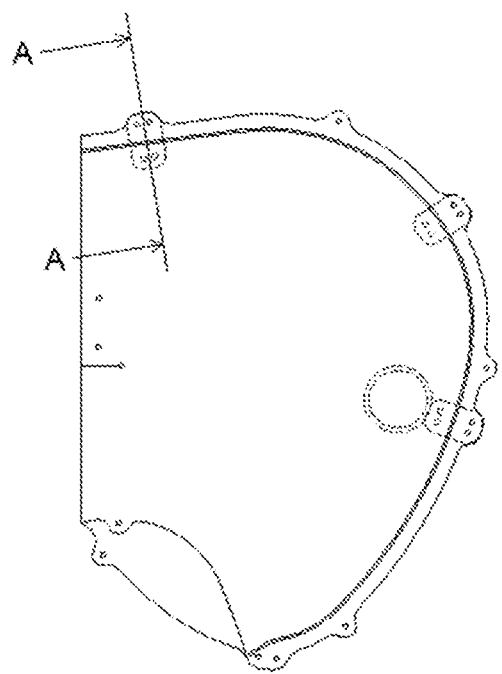
FIG. 6A is a side view of the partially assembled inflatable cushion of FIG. 2 showing section line A-A.

The second panel 107 defines a vent 124 for venting inflation gas from the inflation chamber 117 to an environment external of the airbag module 100. The vent 124 is a permanently open hole in the second panel 107. In other implementations the vent may comprise a selectively openable vent. In other implementations, the vent may be defined by the first panel, or the airbag module may comprise one or more vents of either or both the permanently open and selectively openable types defined by either or both of the first panel and the second panel. As seen in FIGS. 2 and 6A, the vent 124, as well as folding tabs 140, are shown in dashed lines to represent "seeing through" the first panel 102.

The outer surface 104 of the first panel 102 and the outer surface 109 of the second panel 107 comprise an uncoated surface 112. The inner surface 103 of the first panel 102 and the inner surface 108 of the second panel 107 comprise a coated surface 113, wherein the coating comprises silicone. The coated surface 113 prevents unintended leakage of inflation gas from the inflation chamber 117 through the first panel 102 and the second panel 107. In some implementations, the coated surface 113 also prevents leakage through the seams 114, 115. In some implementations, a sew tape may be used to prevent leakage through the seams. The sew tape is disposed along each of the panels ahead of sewing the seams. The sew tape is a strip of airbag fabric that is separately cut from the panels and is disposed on each of the panels prior to sewing the seams. In other implementations, the inner surface of the panels may not include a coating. And, in other implementations, a sealant (e.g., silicone) may be applied to one or both seams 114, 115 after sewing to prevent leakage of inflation gas through the seams 114, 11.

The fully assembled inflatable cushion 101 is then compactly folded to fit within the vehicle seat (or other locations within the vehicle). The inflatable cushion 101 may be folded efficiently and consistently using modern folding machines. To use a folding machine, the inflatable cushion 101 detachably couples to the folding machine during the folding process, such as by detachably coupling a folding tab that is coupled to the inflatable cushion 101 to the folding machine.

To couple the folding tab 140 to the inflatable cushion 101, the folding tab 140 is placed upon a locator tab 116 and between the outer surface 104 of the first panel 102 and the outer surface 109 of the second panel 107 prior to coupling the outer surface 104 of the first panel 102 and the outer surface 109 of the second panel 107 to each other via the first seam 114. As seen in FIG. 1, the second panel 107 defines the locator tab 116 on at least a portion of the first perimeter portion 110 of the second panel 107. To ensure proper placement of the folding tab 140 onto the locator tab 116, the locator tab 116 defines first alignment openings 118 that align with second alignment openings 143 defined by the inner portion 141 of the folding tab 140. The inflatable cushion 101 comprises three folding tabs 140 and three locator tabs 116, and each folding tab 140 and each locator tab 116 define two alignment openings 143, 118, respectively. In other implementations, the inflatable cushion may comprise any number of folding tabs and locator tabs, as well as any number of alignment openings per tab, as necessary for the intended purpose of locating the folding tab along the perimeter of the inflatable cushion. In other implementations, the locator tabs may be defined by the first panel or may be defined by both the first panel and the second panel.

The airbag module 100 may also comprise one or more alignment tabs 125 for properly aligning the first panel 102 and second panel 107 during assembly. The alignment tabs 125 are defined by the first perimeter portion 105 and second perimeter portion 106 of the first panel 102 and the first perimeter portion 110 and second perimeter portion 111 of the second panel 107. The alignment tabs 125 of the first panel 102 align with alignment tabs 125 of the second panel 107 during assembly of the inflatable cushion 101. Some of the alignment tabs 125 of the first panel 102 may align with portions of the locator tabs 116 defined by the first perimeter portion 110 of the second panel 107.

The outer portion 142 of the folding tab 140 extends internally toward a central region 123 of the second panel 107 after the first alignment openings 118 and second alignment openings 143 are aligned and before the first seam 114 is applied. Therefore, when the inflatable cushion 101 is reversed from the inside-out condition to the outside-out condition, the outer portion 142 of the folding tab 140 extends outward away from the central region 123 of the second panel 107 and at least partially beyond a perimeter 122 of the fully assembled inflatable cushion 101. In other words, in the fully assembly condition the outer portion 142 of the folding tab 140 extends beyond the first seam 114 in a direction away from the first perimeter portion 105 of the first panel 102 and the first perimeter portion 110 of the second panel 107. The outer portion 142 of the folding tab 140 defines tooling openings 144 which detachably couple the inflatable cushion 101 to the folding machine. The folding machine can then properly fold the inflatable cushion 101 into a compact shape.

Figure 6B:
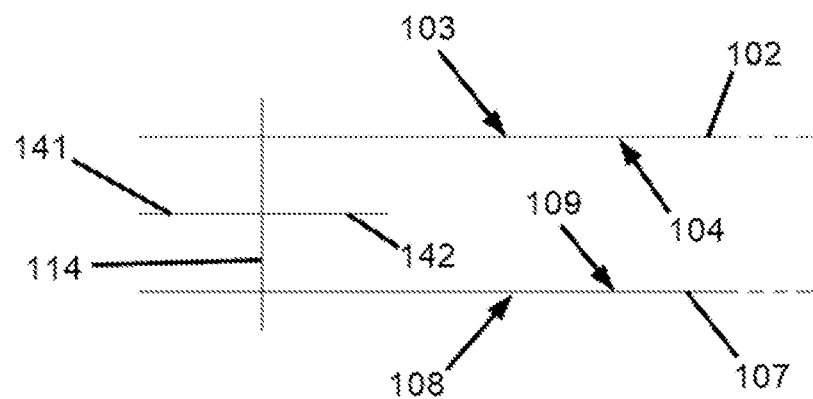
FIG. 6B is a cross-sectional view through section line A-A of FIG. 6A.
Figure 7A:
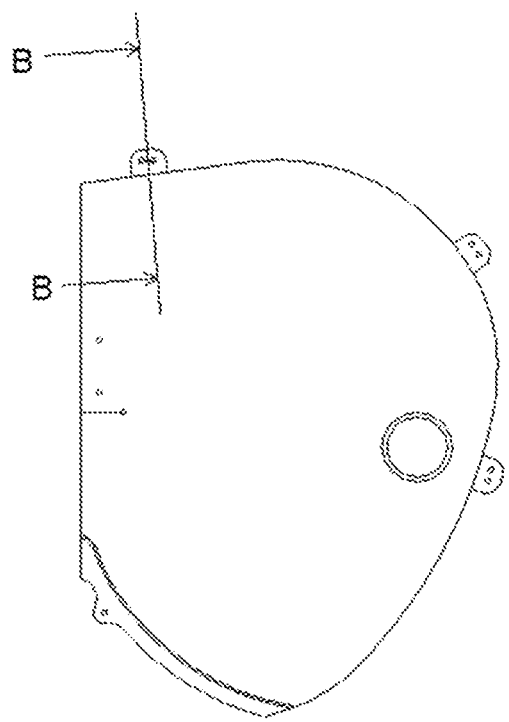
FIG. 7A is a side view of the fully assembled inflatable cushion of FIG. 3 showing section line B-B.
Figure 7B:
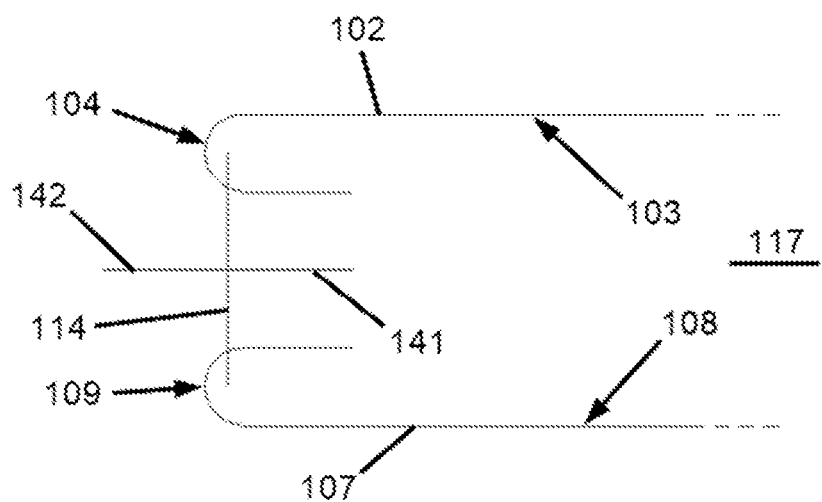
FIG. 7B is a cross-sectional view through section line B-B of FIG. 7A.

FIGS. 6A-6B and 7A-7B show additional views of the seam 114 when the inflatable cushion 101 is in the inside-out condition (FIGS. 6A-6B) and the outside-out condition (FIGS. 7A-7B). FIG. 6B represents the cross-sectional view of section line A-A from FIG. 6A whereas FIG. 7B shows the cross-sectional view of section line B-B from FIG. 7A. Gaps between the first panel 102, second panel 107, the folding tab 140, and the first seam 114 in FIGS. 6B and 7B are shown to enhance the viewability of the various components, however one of ordinary skill in the art will understand the gaps are not actually present once the first seam 114 is applied.

Figure 8A:
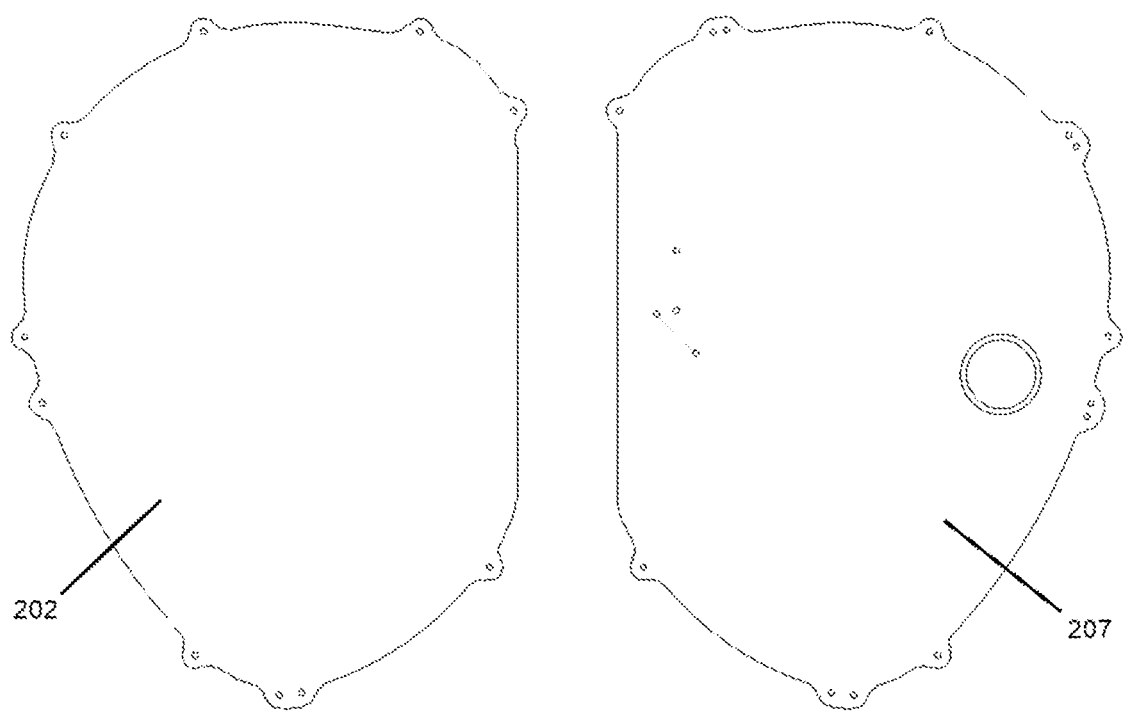
FIG. 8A is a top view of an unassembled inflatable cushion according to another implementation.
Figure 8B:
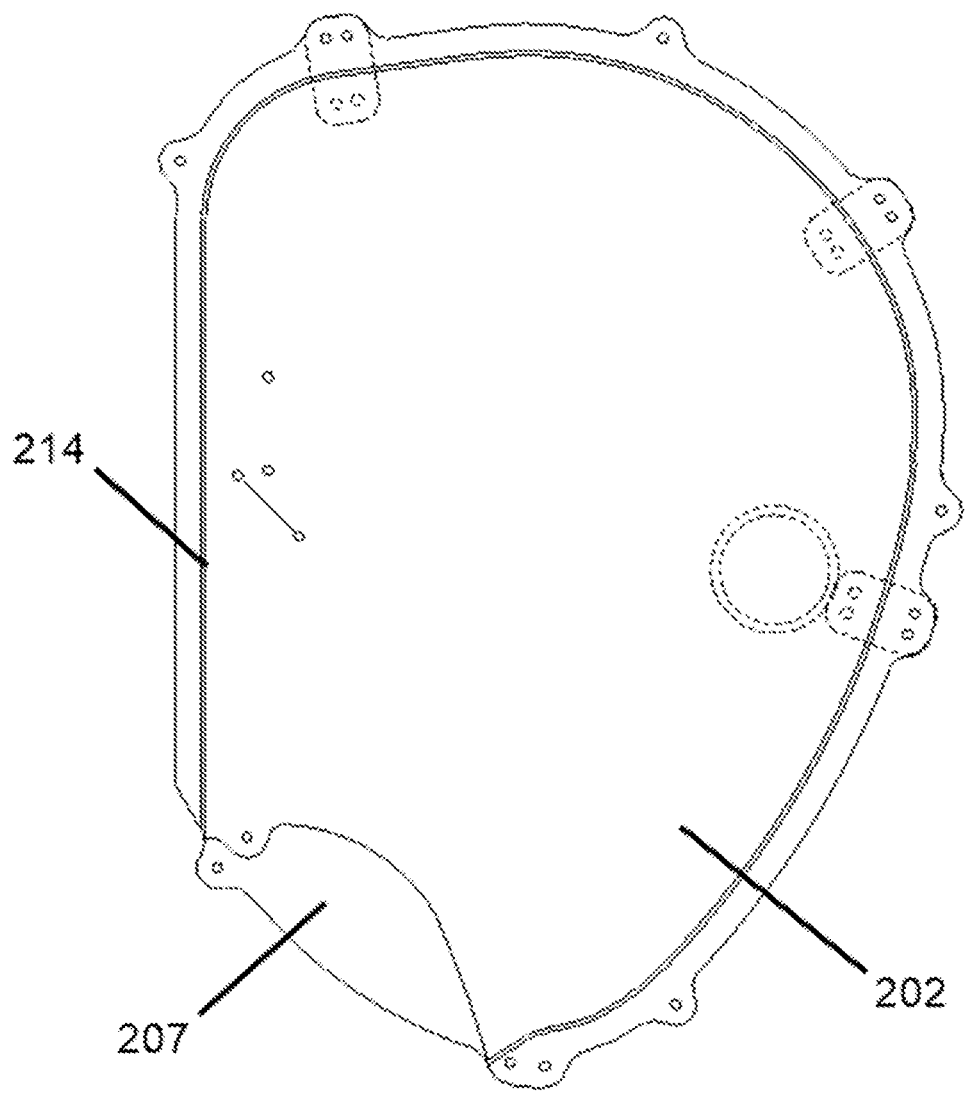
FIG. 8B is a side view of the inflatable cushion of FIG. 8A in a partially assembled condition.
Figure 8C:
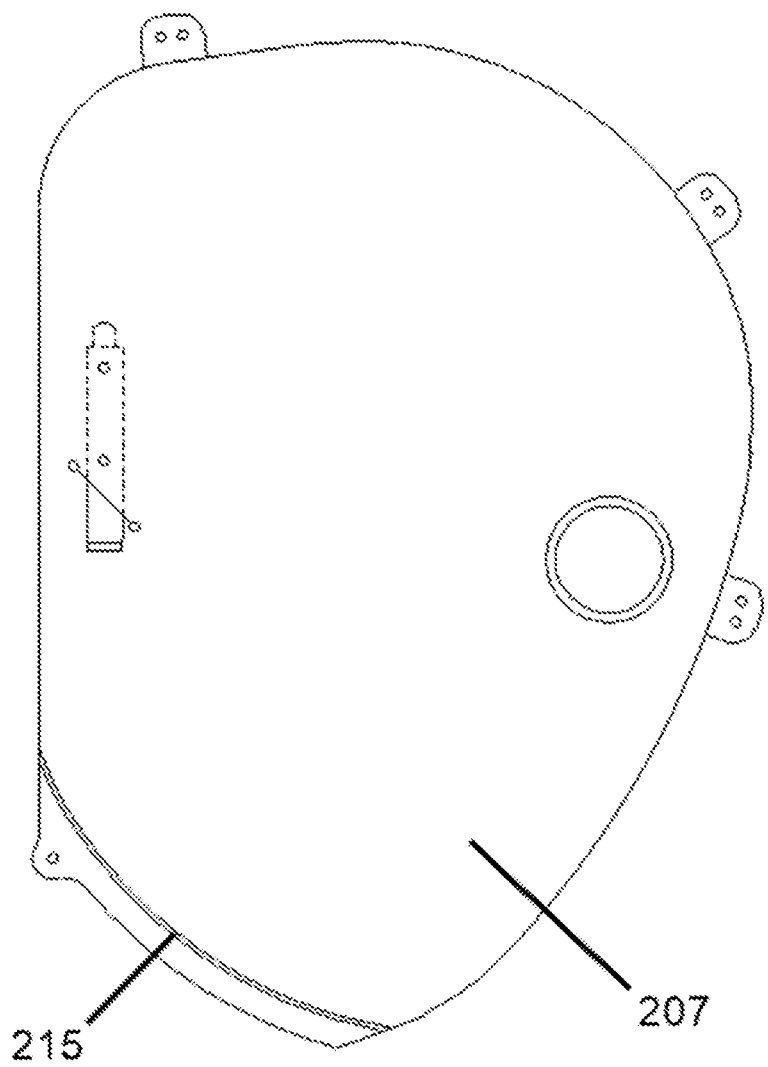
FIG. 8C is a side view of an airbag module comprising the inflatable cushion of FIG. 8A in a fully assembled condition.

The implementation shown in FIGS. 8A-8C is similar to the implementations described above except that a first panel 202 and a second panel 207 are formed separately (e.g., cut separately from each other from one or more sheets of airbag fabric (e.g., woven nylon)) and are laid upon each other such that the perimeter of the first panel 202 and the perimeter of the second panel 207 are aligned with each other before coupling the first panel 202 and the second panel 207 along a first seam 214, wherein the first seam 214 would extend along an area adjacent where the fold line 126 of the central region 119 is in the implementation shown in FIG. 1.

For implementations in which the first panel and the second panel are cut separately (e.g., as shown in FIGS. 8A-8C), the first seam and second seam fully bound the inflation chamber, and the inflation chamber is defined by the first seam, the second seam, and the inner surfaces of the panels. In addition, the inflator mounting portion may be defined by either the first panel or the second panel, or a portion of the inflator mounting portion may be defined by both the first panel and the second panel.

A number of implementations have been described. The description in the present disclosure has been presented for purposes of illustration but is not intended to be exhaustive or limited to the implementations disclosed. For example, the folding tab may be used as a guide (e.g., visual aid) for proper manual folding of the inflatable cushion, rather than using a folding machine. It will be understood that various modifications and variations will be apparent to those of ordinary skill in the art and may be made without departing from the spirit and scope of the claims. Accordingly, other implementations are within the scope of the following claims. The implementations described were chosen in order to best explain the principles of the airbag module and its practical application, and to enable others of ordinary skill in the art to understand the airbag module for various implementations with various modifications as are suited to the particular use contemplated.

The terminology used herein is for the purpose of describing particular implementations only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, operations, elements, and/or components, but do not preclude the presence or addition of one or more other features, operations, elements, components, and/or groups thereof.

What is claimed is:

1. An airbag module for protecting an occupant of a vehicle seat, the airbag module comprising:
   an inflatable cushion comprising a first panel and a second panel, the first panel comprising an inner surface and an outer surface and the second panel comprising an inner surface and an outer surface;
   a folding tab comprising an inner portion and an outer portion; and
   an inflator for providing an inflation gas for inflating the inflatable cushion;
   wherein the outer surface of the first panel and the outer surface of the second panel are coupled to each other along a seam such that the outer surface of the first panel and the outer surface of the second panel face each other along the seam, the seam being adjacent a first portion of a perimeter of the first panel and a first portion of a perimeter of the second panel; and
   wherein the inner portion of the folding tab is disposed between the outer surface of the first panel and the outer surface of the second panel and the folding tab is coupled to the first panel and the second panel by the seam.

2. The airbag module of claim 1, wherein the seam comprises stitching.

3. The airbag module of claim 2, wherein the seam comprises nylon thread.

4. The airbag module of claim 1, wherein the outer portion of the folding tab extends beyond the seam in a direction away from the perimeter of the first panel and the perimeter of the second panel.

5. The airbag module of claim 1, wherein the seam is a first seam, and wherein the inner surface of the first panel and the inner surface of the second panel are coupled to each other along a second seam such that the inner surface of the first panel and the inner surface of the second panel face each other along the second seam, the second seam being adjacent a second portion of the perimeter of the first panel and a second portion of the perimeter of the second panel.

6. The airbag module of claim 5, wherein the second seam comprises stitching, wherein the second seam comprises nylon thread.

7. The airbag module of claim 5, wherein the inner surface of the first panel, the inner surface of the second panel, the first seam, and the second seam define, at least in part, an inflation chamber for the inflation gas.

8. The airbag module of claim 7, wherein a single piece of airbag fabric comprises the first panel and the second panel, wherein the first panel and the second panel are integrally coupled along a fold line, and wherein the inflation chamber is further defined by the fold line.

9. The airbag module of claim 1, wherein a single piece of airbag fabric comprises the first panel and the second panel, wherein the first panel and the second panel are integrally coupled along a fold line.

10. The airbag module of claim 1, wherein the first panel and the second panel are formed separately.

11. The airbag module of claim 1, wherein the perimeter of the first panel and/or the perimeter of the second panel defines a locator tab.

12. The airbag module of claim 11, wherein the inner portion of the folding tab is aligned with the locator tab.

13. The airbag module of claim 12, wherein the locator tab defines a first alignment hole, and the inner portion of the folding tab defines a second alignment hole, wherein the first alignment hole is aligned with the second alignment hole.

14. The airbag module of claim 1, wherein the inner surface of the first panel and the inner surface of the second panel are coated with a sealant material.

15. The airbag module of claim 14, wherein the sealant material comprises silicone.

16. The airbag module of claim 1, wherein the first panel and/or the second panel define a vent.

17. The airbag module of claim 16, wherein the vent is a permanently open vent.

18. The airbag module of claim 1, wherein the first panel and the second panel comprise a woven nylon material.

* * * * *